United States Patent [19]

Torresdal

[11] Patent Number: 4,486,077
[45] Date of Patent: Dec. 4, 1984

[54] DIGITAL METER WITH UNIFORM ILLUMINATION AND LESS INADVERTENT SETTING

[75] Inventor: David N. Torresdal, Redwood City, Calif.

[73] Assignee: Davtron, Inc., Redwood City, Calif.

[21] Appl. No.: 350,764

[22] Filed: Feb. 22, 1982

[51] Int. Cl.³ .................. F21L 7/04; G02B 1/13; G04B 9/00

[52] U.S. Cl. .................. 350/331 R; 368/20; 368/185; 362/31

[58] Field of Search .......... 350/331 R, 345; 368/20, 368/21, 185, 187; 362/31

[56] References Cited

U.S. PATENT DOCUMENTS

| | | | |
|---|---|---|---|
| 2,430,862 | 11/1947 | Carscallen et al. | 362/31 X |
| 3,653,138 | 4/1972 | Cooper | 350/345 X |
| 3,752,974 | 8/1973 | Baker et al. | 362/31 X |
| 4,112,669 | 9/1983 | Kaneko | 368/187 |
| 4,212,048 | 7/1980 | Castleberry | 350/345 X |

FOREIGN PATENT DOCUMENTS 0587766 10/1924 France .................. 362/31

*Primary Examiner*—John K. Corbin
*Assistant Examiner*—David Lewis
*Attorney, Agent, or Firm*—Willis E. Higgins

[57] ABSTRACT

A multiple function, multiple digit meter includes a light directing structure (18) for providing uniform illumination to digits (14) of display (12). A block (20) of clear plexiglass has a surface (22) facing the display (12). Edges (24, 26) of the block (20) have notches (27, 28) for receiving incandescent bulbs (30) to direct light into the block (20). The block (20) has a back surface (32) which curves upward moving away from the bulbs (30) toward the center (34) of the block (20). Surface (32) is reflective to direct light toward the display (12). The configuration of the surface (32) causes an increasing percentage of light received at the surface (32) from the lamps (30) to be reflected toward the display (12), with increasing distance from each lamp (30). The panel meter (40) has a first manually actuated means (70) for selecting one of the multiple functions of the meter (40) and a second manually actuated means (72) for changing a displayed value of a selected function. Simultaneous actuation of the first and second manually actuated means (70 and 72) selects a first one of the digits (14) for setting. Actuation of the second manually actuated means (72) then sets the first one of the digits (14). Actuation of the first manually actuated means (70) then selects a second one of the digits (14) for setting by actuation of the second manually actuated means (72) and so forth.

7 Claims, 4 Drawing Figures

DIGITAL METER WITH UNIFORM ILLUMINATION AND LESS INADVERTENT SETTING

BACKGROUND OF THE INVENTION

1. Field of the Invention

This invention relates to an improved light directing structure for use with a liquid crystal display and to a multiple function digital meter with improved ease of operation which incorporates the light directing structure. More particularly, it relates to such a light directing structure for increasing the contrast of a liquid crystal display and to a digital panel meter which is less prone to improper operation during resetting.

2. Description of the Prior Art

Aircraft instrumentation panels provide a very demanding environment for digital panel meter display technology. The displays of such panel meters must be readily visible under a wide variety of cockpit lighting conditions. Thus, even though light emitting diode (LED) displays are readily visible under ordinary lighting conditions, they are not readable in full sunlight, which is often encountered in an aircraft cockpit. On the other hand, liquid crystal displays are readily visible in full sunlight, but present visibility problems in a darkened cockpit. Backlighting for such liquid crystal displays has been provided in the prior art, but has hitherto not provided sufficient and uniform illumination to meet the demands of the aircraft cockpit environment.

There are a variety of digital panel meters presently available which are suitable for aircraft applications. For example, such meters available from Davtron, Incorporated, Redwood City, Calif., under the designations of Model 811B, Model 701B, and Model 655, respectively provide a multiple function clock, a digital ADF indicator, and a meter indicating five different aircraft operating parameters. These digital panel meters utilize incandescent illuminated digits in order to provide a high contrast display which is easily visible under a wide variety of cockpit lighting conditions. Gas discharge displays are also suitable for aircraft digital panel meters. However, both incandescent and gas discharge displays are expensive and have relatively large power demands. Gas discharge displays also have relatively short operating lifetimes, on the order of 2,000 hours, as compared to 30,000 hours for a liquid crystal display. Despite these disadvantages, the precision of digital displays has resulted in their widespread use in aircraft.

Also, prior art digital meters have been prone to improper operation, particularly to inadvertent resetting by those unfamiliar with the digital meter controls. Such inadvertent resetting can present a significant safety hazard in an aircraft by destroying information needed by the pilot.

SUMMARY OF THE INVENTION

Accordingly, it is an object of this invention to provide a light directing structure which will give greater and more uniform contrast in a liquid crystal display.

It is another object of the invention to provide a low power light source assembly which will produce uniform illumination with high contrast in a liquid crystal display.

It is another object of the invention to provide a multiple function, multiple digit meter having a two-button control which is less prone to improper operation than prior art digital meter controls.

It is still another object of the invention to provide a multiple function liquid crystal panel suitable for aircraft applications and which is easier to operate than prior art digital meters.

The attainment of these and related objects may be achieved through use of the light directing structure and digital meter herein disclosed. The light directing structure of this invention is intended for use with a liquid crystal display. The structure comprises a body of material transparent to light, such as plexiglass or a similar clear material. The body of transparent material has a light transmissive surface to be positioned facing the liquid crystal display. At least one edge of the body of transparent material substantially normal to the light transmissive surface is configured to receive a light source, such as an incandescent bulb. A reflective surface of the body opposite to the light transmissive surface is shaped to reflect an increasing percentage of light received from the light source from the reflective surface toward the light transmissive surface, as a function of increasing distance from the light source. Typically, the reflective surface is silvered or otherwise coated to make it reflect light. In one form of the invention, the reflective surface curves toward the transmissive surface, moving away from the light source.

In another aspect of the invention, a multiple function meter has a multiple digit display. A first manually actuated means is connected to the display for selecting one of the multiple functions. A second manually actuated means is connected to the display for changing a displayed value of a selected function. Simultaneous actuation of the first and second manually actuated means selects a first one of the multiple digits of the display for setting. Actuation of the second manually actuated means then sets the first one of the multiple digits. Further actuation of the first manually actuated means then selects a second one of the multiple digits for setting by actuation of the second manually-actuated means, and so forth. After the last of the multiple digits has been selected in this manner, a subsequent actuation of the first manually actuable means returns the meter to one of its multiple functions. The use of two such buttons or similar actuators in a control for a multiple function, multiple digit meter reduces inadvertent errors in function control and setting, thus avoiding the loss of desired information shown on the display.

In a preferred form of the invention, a multiple function, multiple digit meter utilizing the function control of this invention also incorporates the light directing structure of the first aspect of the invention.

The attainment of the foregoing and related objects, advantages and features of the invention should be more readily apparent to those skilled in the art after review of the following more detailed description of the invention, taken together with the drawings, in which:

DETAILED DESCRIPTION OF THE INVENTION

Figure 1:
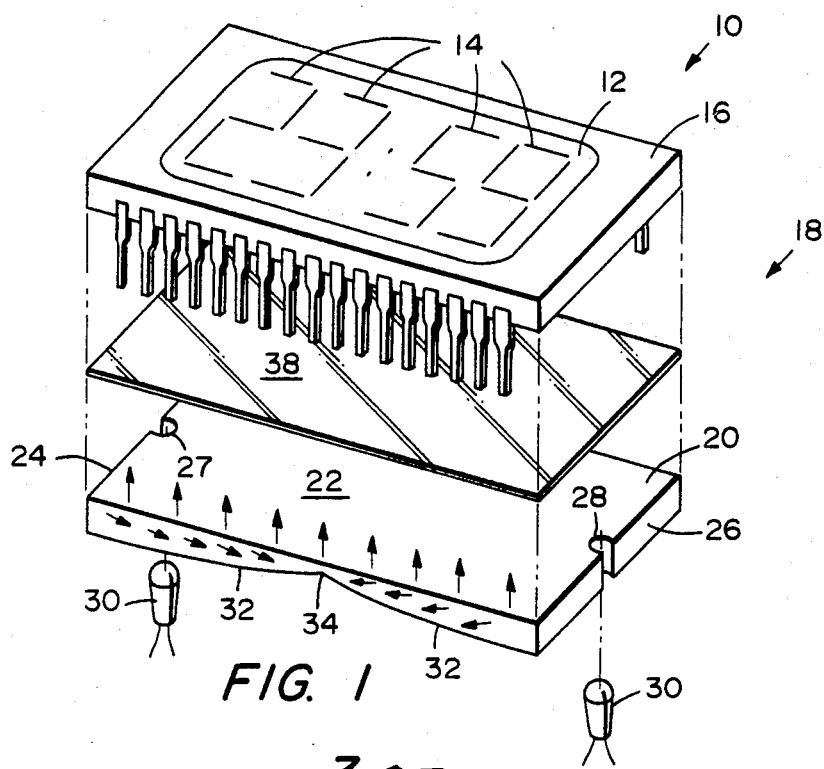
FIG. 1 is a perspective view of one embodiment of the invention.

Turning now to the drawings, more particularly to FIG. 1, there is shown a display assembly 10 incorporating the invention. The display assembly 10 includes a conventional liquid crystal display 12 of the transreflective type, i.e., in which the digits 14 of the display are formed by light either selectively transmitted through the display 12 or reflected from the display at the digits 14 as a result of actuating signals applied to alter the orientation of a liquid crystal material within the display 12, in a known manner. The liquid crystal display 12 is contained within a conventional dual-in-line electronics package 16. Such transflective liquid crystal displays are commercially available, for example, from General Electric Company under the designation 34D3F02K6B.

Disposed beneath the package 16 containing the liquid crystal display 12 is a novel light directing structure 18 in accordance with this invention. The light control structure 18 includes a block 20 of clear plexiglass having a surface 22 facing the liquid crystal display 12. Edges 24 and 26 of the block 20 have notches 27 and 28 in the form of sectors representing about 300° of a circle. Miniature incandescent light bulbs 30 of the so-called "grain-of-wheat" type are mounted in each notch 27 and 28 to direct light into block 20, as well as toward liquid crystal display 12. The block 20 has a back surface 32 which curves upward moving away from the lamps 30 toward the center 34 of the block 20. Surface 32 has a reflective layer, such as of silver or aluminum vapor deposited or otherwise applied to the surface 32. As a result of the configuration of surface 32, an increasing percentage of light from the lamps 30 received at the surface 32 is reflected upward toward the liquid crystal display 12, moving away from each lamp 30 toward center 34 of the block 20. Arrows 36 indicate the paths of travel of the light from lamps 30 to the display 12. An optional color filter 38 is used to provide a desired color for the illuminated digits 14.

Since the percentage of light reflected upwards by surface 32 increases near to center 34 of the block 20, uniform illumination of the liquid crystal display 12 occurs, so that the digits 14 are uniform in their brightness. The light control structure 18 configured in this manner allows enough light to be reflected from two bulbs 30 of the grain-of-wheat type so that the numerals 14 in display 12 are clearly visible under essentially any ambient light conditions.

Figure 2:
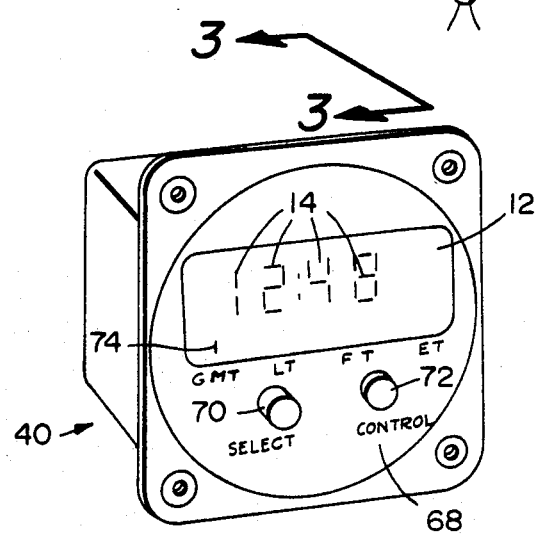
FIG. 2 is a perspective view of a digital panel meter incorporating the invention.
Figure 3:
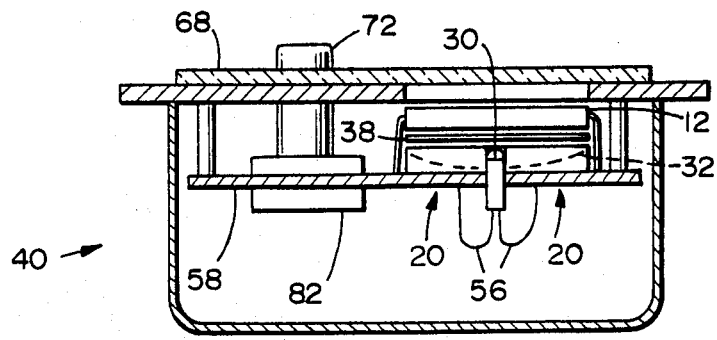
FIG. 3 is a section view taken along the line 3—3 in FIG. 2.

Turning now to FIGS. 2 and 3, there is shown a digital panel meter 40 in accordance with the invention. As is shown in FIG. 3, this panel meter incorporates the light directing block 20 shown in FIG. 1. Leads 56 of the bulb 30 are connected to printed circuit board 58 in a conventional manner. The light from bulb 30 is reflected upward by the surface 32 as shown in FIG. 1. The color filter 38 rests between the light control block 20 and the liquid crystal display 12.

Front panel 68 of the digital panel meter shows the novel control buttons 70 and 72 in accordance with the invention. The digital panel meter 10 is a multi-function aircraft clock, which will display Greenwich Mean Time, local time, flight time and elapsed time. The indications GMT, LT, FT and ET on the front panel 68 respectively designate the different modes. Select button 70 sequentially selects these functions and annunciator bar 74 in the liquid crystal display 12 shows which function has been selected. The control button 72 controls the function selected. In the standard mode of operation, the control button 72 will reset flight time when flight time is selected and will reset and start elapsed time when elapsed time is selected. When GMT or LT is selected, the control button has no effect.

The set mode is entered by pressing both the select and control buttons 70 and 72 simultaneously. The most significant digit 14 of the display 12 then flashes. The flashing digit 14 can then be set with the control button 72 to a desired number. The next digit 14 is then selected for setting with the select button, then set with the control button. Thus, the select button selects the digit to be set, and the control button steps this digit until the desired number is reached. The digit that has been selected for setting is always flashing. When the last digit 14 has been selected (and usually set), the next push of the select button 70 brings the clock back to normal operation.

In operation, the flight time is an alarm function, so that an alarm sounds when flight time equals or exceeds the time set for this function. The elapsed time can be set in minutes and seconds and will count down to zero and sound an alarm.

Figure 4:
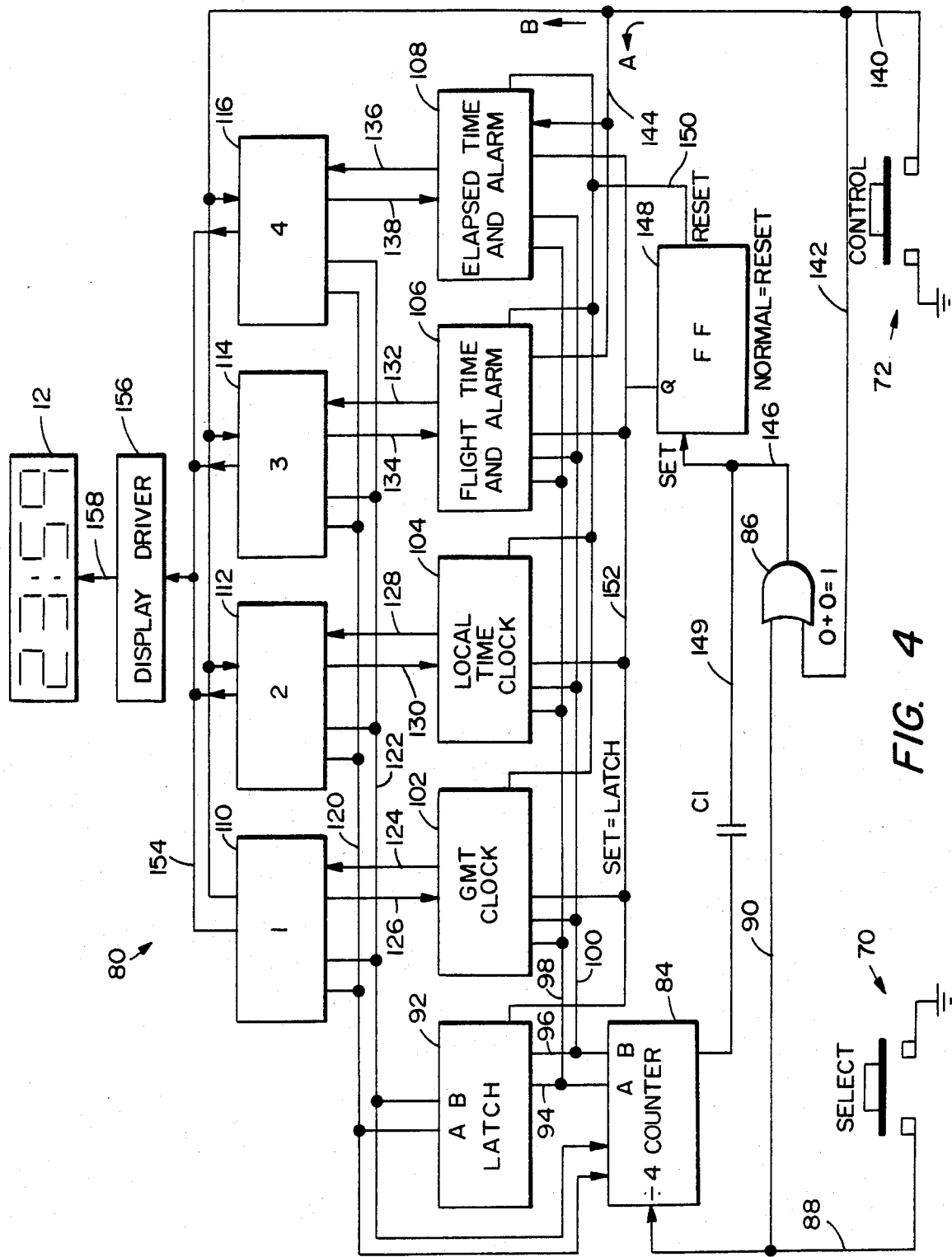
FIG. 4 is a schematic diagram of an electrical circuit employed in the digital panel meter of FIG. 2.

FIG. 4 shows a schematic diagram of an electrical circuit 80 contained within integrated circuit module 82 (FIG. 3), for implementing the above described operation of the select, control, and setting functions. Select button 70 is connected between ground and inputs to a divide-by-four counter 84 and NOR-gate 86 by lines 88 and 90, respectively. A and B outputs of the divide-by-four counter 84 are connected to select counter latch 92 by lines 94 and 96. Lines 98 and 100 also connect the A and B outputs of divide-by-four counter 84 to GMT clock circuit 102, local time clock circuit 104, flight time and alarm clock circuit 106 and elapsed time and alarm clock circuit 108. Latch circuit 92 has its A and B outputs connected as inputs to the divide-by-four counter 84 and to electronic switches 110 through 116 by lines 120 and 122. GMT clock circuit 102 provides an input to electronic switch 110 on line 124, and receives an input from the electronic switch 110 on line 126. Similarly, local time clock circuit 104 provides input to electronic switch 112 on line 128 and receives an input from the electronic switch 112 on line 130. Flight time and alarm clock 106 supplies an input to electronic switch 114 on line 132, and receives an input from the electronic switch 114 on line 134. Elapsed time and alarm circuit 108 provides an input to electronic switch 116 on line 136 and receives an input from electronic switch 116 on line 138.

Control switch 72 is connected between ground and the other input to NOR-gate 86 by lines 140 and 142. Lines 140 and 144 also connect control switch 72 to provide inputs to the clock circuits 102-108. Line 140 also connects the control switch 72 to provide inputs to each of the electronic switches 110-116. The output of NOR-gate 86 is connected by line 146 to the set terminal of bistable flipflop circuit 148. Lines 146, 149 and capacitor C1 also capacitively couple the output of NOR-gate 86 to the divide-by-four counter 84. Line 150 is connected to supply reset signals from each of the clock circuits 102-108 to the reset terminal of bistable flipflop circuit 148. The Q output of bistable flipflop 148 is connected by line 152 to the latch circuit 92 and each of the clock circuits 102-108.

The electronic switches 110 through 116 are connected to supply inputs on line 154 to display driver circuits 156. The display driver circuits 156 in turn supply drive signals on line 158 to liquid crystal display 12.

In operation, closure of select switch 70 toggles the divide-by-four counter 84, which turns on one of the electronic switches 110 through 116, in succession, for displaying GMT, LT, FT or ET, as generated respectively by the clock circuits 102–108, on display 12. Closure of the control switch 72 resets FT and ET if they have been selected for display, through line 144.

When select button 70 and control button 72 are pushed together, they set the bistable flipflop 148, latch via line 52 the clock circuit 102–108, the output of which is being displayed, reset the divide-by-four counter 84 via line 148 and capacitor C1 and enable the set mode via latch 92. Subsequent closure of control switch 72 sets the digit of display 12 which is flashing, through the electronic switch 110–116 held on by the latch 92. Subsequent closure of the select button 70 selects the next digit of display 12 to be set by toggling the divide-by-four counter 84. When the last digit of display 12 has been set, and the select button is pushed again, a reset pulse is generated on line 150 by clock circuit 108. Bistable flipflop circuit returns to its normal reset mode, and the output of latch 92 sets divide-by-four counter 84 to its original count. The clock circuit 102–108 corresponding to the original count now supplies its outputs to display 12 in the normal manner.

The above described control functions for the digital panel meter of FIGS. 2, 3 and 4 allows an unfamiliar pilot or other user to use the clock 40 non-destructively with no instruction. With only a minimum of instruction, the pilot can use the clock 40 completely and will retain the operating procedure, because each button has one use only and a double function of that use. Thus, in effect a four-button design has been provided with the two set buttons with simultaneous operation of the buttons when it is desired to enter the setting mode. Inadvertent setting is therefore eliminated. The light directing structure of this invention allows liquid crystal displays to be used in aircraft cockpit panel meters and in similar environments where high visibility under widely varying light conditions is required. Highly visible displays using lower power than in the prior art and which are lower in cost, lower in power demand, and have much longer operating lifetimes than prior art incandescent or gas discharge displays are therefore provided.

It should further be apparent to those skilled in the art that various changes in form and details of the invention as shown and described may be made. For example, a clock module incorporating the two button setting aspect of this invention could incorporate a date function in place of, or in addition to, the functions shown. Both the light directing structure and the two button setting aspect of this invention could be used with digital meters displaying other functions than those associated with time. Also, for certain displays, such as those with a more square configuration than the display 12, a single bulb could be centrally located in a light directing structure with a reflecting surface curving upwards away from the bulb toward the edges of the structure. It is intended that such changes be included within the spirit and scope of the claims appended hereto.

What is claimed is:

1. A multiple function, multiple digit meter including a display structure, which comprises a liquid crystal display having multiple digits and a front surface for display of information to an observer by transmission of light through said liquid crystal display and a back surface, a solid body of material transparent to light and having a light transmission surface facing the back surface of said liquid crystal display, said solid body of material having at least one edge substantially normal to the light transmission surface having a notched portion, an incandescent bulb light source positioned in said notched portion to direct light into said solid body through the at least one edge, said solid body of material having a reflective surface opposite to the light transmissive surface curved toward the light transmissive surface with increasing distance from said incandescent bulb light source to reflect an increasing percentage of light received from the light source as a function of the increasing distance from said incandescent bulb light source, and a first manually actuated means for selecting one of the multiple functions and a second manually actuated means for changing a displayed value of a selected function, simultaneous actuation of said first and second manually actuated means selecting a first one of the multiple digits for setting, actuation of the first manually actuated means then selecting a second one of the multiple digits for setting by actuation of said second manually actuated means.

2. The multiple function, multiple digit meter of claim 1 in which actuation of said first manually actuable means after setting at least one of the multiple digits returns said meter to one of its multiple functions.

3. The multiple function, multiple digit meter of claim 1 additionally comprising a means for flashing the one of the multiple digits selected for setting.

4. A multiple function meter comprising a multiple digit display having multiple digits, a first manually actuated means connected to said display for selecting one of the multiple functions, a second manually actuated means connected to said display for changing a displayed value of a selected function, simultaneous actuation of said first and second manually actuated means selecting a first one of the multiple digits of said display for setting, actuation of said second manually actuated means then setting the first one of the multiple digits, actuation of said first manually actuated means then selecting a second one of the multiple digits for setting by actuation of said second manually actuated means.

5. The multiple function meter of claim 4 in which the actuation of said first manually actuable means after selection of a last one of the multiple digits of said display returns said meter to one of its multiple functions.

6. The multiple function meter of claim 4 additionally comprising a means for flashing the one of the multiple digits of said display selected for setting.

7. The multiple function meter of claim 4 in which said meter is a clock and the multiple functions are different timekeeping modes.

* * * * *